(12) United States Patent
Thiyagarajan

(10) Patent No.: US 6,640,779 B1
(45) Date of Patent: Nov. 4, 2003

(54) LOW COST NEW INTERNAL COMBUSTION ENGINE WITH INCREASED MECHANICAL EFFICIENCY, FUEL SAVER AND POLLUTION CONTROLLED

(76) Inventor: Marimuthu Ramu Thiyagarajan, No. 76, Main Road, Thirumal Nagar, Pondicherry (IN), 605 013

(*) Notice: Subject to any disclaimer, the term of this patent is extended or adjusted under 35 U.S.C. 154(b) by 0 days.

(21) Appl. No.: 09/830,487

(22) PCT Filed: Jan. 5, 1999

(86) PCT No.: PCT/IN99/00001

§ 371 (c)(1), (2), (4) Date: Apr. 27, 2001

(87) PCT Pub. No.: WO00/40840

PCT Pub. Date: Jul. 13, 2000

(51) Int. Cl.[7] .................................................. F02P 5/00
(52) U.S. Cl. ............... 123/406.75; 123/193.4; 123/196 R; 123/386
(58) Field of Search ................ 123/406.75, 386, 123/196 R, 193.4, 406.66, 198 D

(56) References Cited

U.S. PATENT DOCUMENTS 4,180,027 A  * 12/1979  Taylor ..................... 123/41.35
4,414,929 A  * 11/1983  Sakurai .................... 123/73 R
4,440,118 A     4/1984   Stang
5,588,504 A  * 12/1996  Spiegel et al. ............... 184/6.8
5,979,298 A    11/1999   Whitacre
6,158,408 A    12/2000   Hauder

* cited by examiner

Primary Examiner—Hieu T. Vo
Assistant Examiner—Johnny H. Hoang
(74) Attorney, Agent, or Firm—Michael A. Shippey

(57) ABSTRACT

A low cost new internal combustion engine with increased mechanical efficiency, fuel saver and pollution control and in particular a new internal combustion engine having improved lubricating mechanism for getting extra time to burn the fuel without knock and combustion noise for achieving increased fuel economy wherein the lubricating system consists of at least one first cross head oil groove formed at the interface cylindrical bearing surfaces of the moving contacting parts on the inner and outer surface of internal combustion engine components. At least one axial oil groove intersecting with first or second oil groove on outer surface of piston skirt, at least one deep "v" furrow and one slot on the outer surface of rocker arm and the spark ignition or fuel injection device having spring governed centrifugal advance fly weights for self regulation in proportion with engine speed from idle to maximum engine speed.

16 Claims, 6 Drawing Sheets

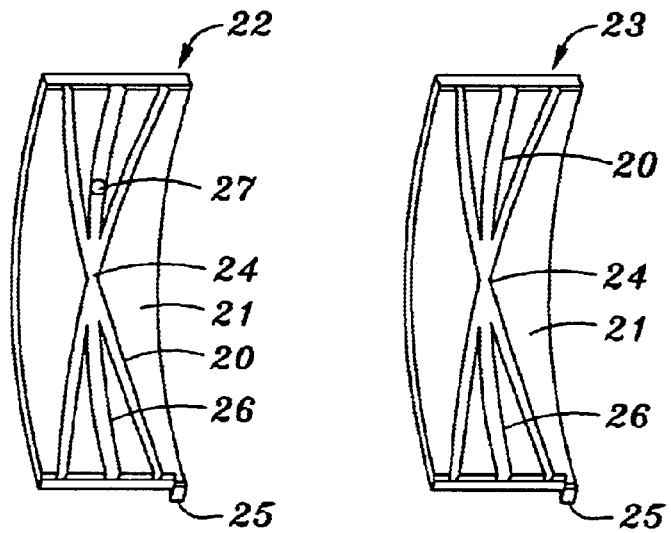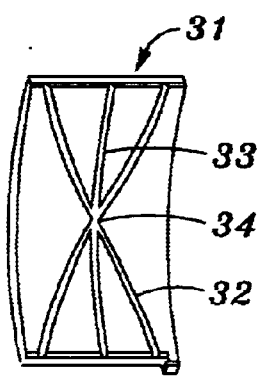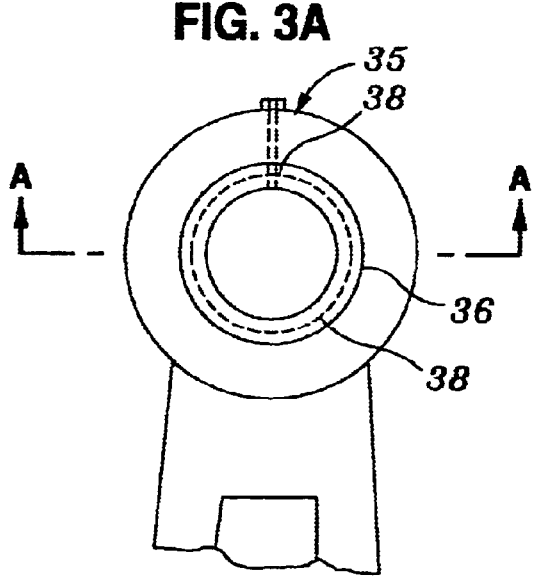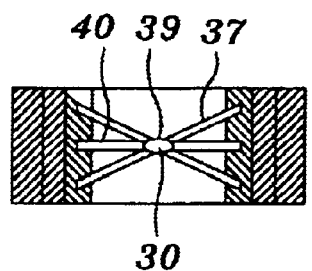

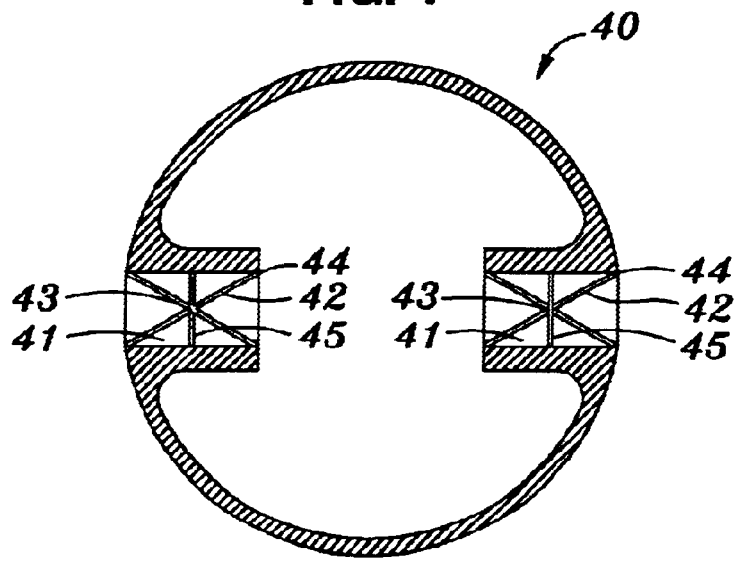
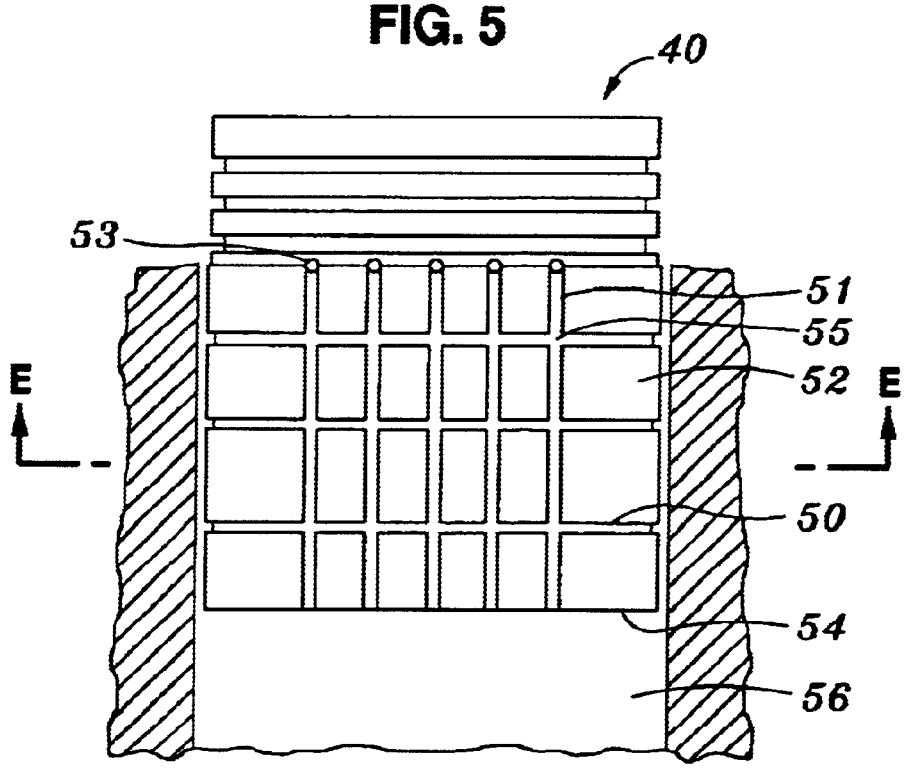

Full Advance position

Position of Weights before Advance Starts

Full Advance position

Initial Position

End Position

Position of Weights before Advance Starts 176
179
175

LOW COST NEW INTERNAL COMBUSTION ENGINE WITH INCREASED MECHANICAL EFFICIENCY, FUEL SAVER AND POLLUTION CONTROLLED

TECHNICAL FIELD

The present invention relates to a low cost new internal combustion engine with increased mechanical efficiency, fuel saver and pollution controlled and in particular, a new internal combustion engine having an improved lubricating mechanism so as to increase mechanical efficiency, diminution of wear, elimination of destructive heating together with an introduction of earlier ignition/injection system thereby getting extra time to burn the fuel without knock and noise due to increase in mechanical octane/cetane numbers of engines resulting in achieving increased fuel economy with exhausts/end products leaving the system thereby control pollutants.

This low cost new internal combustion engine technology (2/4 cycle) finds wide applications for automotive including racing, locomotive, marine, industrial, agricultural, aeronautical fields and all other piston-type reciprocating new as well as old in-use internal combustion engine giving real performance benefits to the user.

BACKGROUND ART

It may here now be reflected that till date developments in internal combustion engines are based on expensive materials and high cost technology like engine management system and also by using costly petroleum based Fuels, lubricants with formulated additive packages for achieving better fuel economy, performance and reduction of tail pipe emissions.

A major concern today is to improve fuel efficiency, by adding additive packages or concentrates to the compositions of fuels, lubricants for reducing friction, emissions, deposits, knock, vapour lock, corrosion, valves recession and for improving spark enhancing,ignition quality, cleaning in internal combustion engines which are safe for environmental and economically attractive. However the addition of additives causes the misapprehension of fuel and lubricant and deteriorates internal combustion engines. Fuel economy, Safety, Performance and Emission are formed varying from engine to engine of similar category.

In practice, it is observed that at present in internal combustion engine some inner surface of the cylindrical bearing are lubricated by providing circular oil groove at the centre of bearings and/or with oil pockets. As a result of insufficient lubrication, wear begins from the very first day itself caused by the rubbing velocity at the instant of starting as the oil film formation depends on the squeezed oil quantity entering the clearance volume either from pressure feed or splash system. Trlbology includes the relationship between friction, lubrication and wear. The friction between rotating, oscillating, sliding, rotary, reciprocating and intermittent reciprocating contacting parts can be drastically reduced by the presence of lubricating films between contacting surfaces. The function of lubricant is to separate appropriately the two contacting surfaces and so reduce both mechanical and fluid friction.

It is further noticed that the interfaces between crankshaft main journal—main insert bearing, crankshaft big end journal—connecting rod big end insert bearing, connecting rod small end—piston pin, piston boss—piston pin, piston and rings—cylinder liner, cam-follower, rocker arm pivot-rocker arm shaft, rocker arm pad—valve stem, push rod joints, tappet—tappet bore and others, are subjected to high load with moderate relative velocity and designed to operate in the hydrodynamic, transient and boundary lubrication regime. Hydrodynamic regime will be effective only with respect to rotational inertia forces of components. However, fluctuating inertia forces of reciprocating masses and enormous gas pressure acting on the piston crown, piston pin and small end causes engine bearing load fluctuations and ultimately affects the hydrodynamic lubrication regime. In addition, during stop and go operations and at the moment of starting the engine from rest or just prior to coming to rest, the hydrodynamic lubrication regime shifts through transient lubrication regime and then to boundary lubrication regime as rotational speed decreases, inducing high frictional forces in the interface causing rubbing velocity and wear. The interface connecting rod small end—piston pin and piston pin—piston boss does not enjoy continuous rotation motion and absence of hydrodynamic lubrication regime is significant and only acceptable lubrication due to upper and lower reversals.

Accordingly, an object of the present invention is to provide a low cost new internal combustion engine with increased mechanical efficiency, fuel saver and pollution controlled, which is novel in its construction and obviates all disadvantages and drawbacks associated with the internal combustion engine which is simple in its construction, cheap in original costs and most important is its wide applications for automotive including racing, locomotive, marine, industrial, agricultural, aeronautical fields and all other piston-type reciprocating engine as well as in old in-use internal combustion engine giving real performance benefits to the user.

Another object of the present invention is to provide a low cost new internal combustion engine which saves fuel considerably and controls pollutant/cleaner combustion end products/exhausts.

A still further object of the present invention is to provide a low cost new internal combustion engine having a novel lubrication system to maintain adequate hydrodynamic lubrication regime for proper lubrication, good stability, sufficient cooling, build high film strength to resist fatigue stress, avoid incipient wear, reduce friction and thereby increase fuel efficiency, safety, performance and reduce exhaust emission.

Yet a further object of the present invention is to provide low cost new internal combustion engine which is having a closed continuous lubricating oil grooves at pressure feed zone and open ended grooves for splash feed zone on the cylindrical interface of the contacting parts to achieve high film strength without affecting the load bearing capacity for reducing friction.

A still another object of the present invention is to provide a low cost new internal combustion engine which is having various types of oil grooves namely, helical, spiral, circular, curved, straight and the nature of grooves are cross-cut, parallel, continuous or a combination thereof depending on the nature of relative motions and loading.

Yet a still another object of the present invention is to provide a low cost new internal combustion engine wherein by incorporating above said lubrication patterns the physical and chemical delays are reduced thereby enabling the engine to bum the formulated fuel without knock and combustion noise and increases mechanical octane/cetane numbers.

Another further object of the present invention is to provide a low cost new internal combustion engine which facilitates the rise of low octane/cetane rating fuels reducing requirements of additives involving use of low cost fuels.

A still another further object of the present invention is to provide a low cost new internal combustion engine which facilitates the use of low grade lubricant oil without certain additives making it cheaper in cost.

DISCLOSURE OF THE INVENTION

Keeping the above objects in mind, the present invention thus provides a low cost internal combustion engine with increased mechanical efficiency, fuel saver and pollution controlled comprises main insert bearing which support a crankshaft having rotary motion for converting sliding motion of piston(s) due to pressure of combustion system; the said crankshaft is connected to the said piston through a connecting rod without or with cross head and piston pin; the said connecting rod whose big end attached to the said crankshaft by big end insert bearings for rotary motion and small end attached to said piston pin through connecting rod small end bush or directly for transmitting oscillating motion and the said piston pin connected directly to the piston pin bosses of the said piston having piston skirt for guiding inside the cylinder bore for reciprocating motions; camshaft driven by the said crankshaft for actuating inlet and exhaust valves/injectors controlling the said combustion system; the said camshaft supported by cam bush or cam journal housing in cylinder head for transmitting rotary motion of said cam shaft to sliding motion of tappet inside tappet bore or cam follower inside cam follower bore, Fuel injection pump roller tappet inside fuel injection roller tappet bore; rocker arm mounted on rocker shaft through rocker arm bush or directly for transmitting intermittent reciprocating motion and engaged on one side with push rod pushed up by said tappet and other end engaged with valve stem for actuating said valves or injectors; lubricant oil used to lubricate the interfaces of contacting parts for lubrication; the said combustion system draws homogenous mixture of fuel and air have spark ignition device for ignition or with metered-out charges of fuel injected by an injection device controlled by spring governed centrifugal advance mechanism for the self regulation of ignition or injection with respect to crank angle for effective utilisation of combustion pressure acting on the crown of the said piston without knock or combustion noise and combustion noise and combustion end products leave the said combustion system as exhaust emission, characterised in that the lubricating system consists of:

(a) at least one first cross cut oil groove formed at the interface cylindrical bearing surface of the contacting parts on the inner surface of main insert bearing, connecting rod big end insert bearing, cross head bearing, connecting rod small end bush, connecting rod small end, piston-pin bosses, cam bush, cam follower bore, fuel injection pump roller tappet bore, rocker arm bush, rocker arm and on the outer surface of piston skirt, cam shaft main journal, rocker arm shaft, tappet, cam follower, fuel injection pump roller tappet adopted as reservoir for receiving and distributing oil frown the supply source, the crosscut points being positioned at the maximum stress zones for maintaining adequate oil supply for cooling and reducing contact in interface;

(b) at least one second circular oil groove formed at the interface cylindrical bearing surface of the contacting parts on the outer surface of piston skirt, tappet, cam follower, fuel injection pump roller tappet, cam shaft main journal, rocker arm shaft and on the inner surface of main insert bearing,connecting rod big end insert bearing, cross head bearing, connecting rod small end bush, connecting rod small end, piston-pin bosses, piston skirt, cam bush, cam follower bore, fuel injection pump roller tappet bore, rocker arm bush and rocker arm for receiving and distributing oil to the said first cross cut oil groove for maintaining adequate oil supply;

(c) at least one third axial oil groove intersecting with first or second oil grooves and/or in communication with oil escape groove or hole formed on the piston skirt outer surface for maintaining adequate lubricating oil supply for proper sliding motion, cooling and avoid contact due to thrust force with said cylinder bore;

(d) at least one deep "v" furrow formed on the upper surface of rocker arm lengthwise for onward transmission of escape oil to both ends;

(e) at least one slot formed on the side or upper surface of rocker arm for onward transmission of escape oil to both ends; and (f) the said spark ignition or fuel injection device having spring governed centrifugal advance fly weights for self reguiation in proportion with engine speed from idle to maximum engine speed.

In internal combustion engine, the major friction is at moving part cylindrical interfaces, which are subjected to rotary, oscillating, sliding, reciprocating and intermittent reciprocating relative motions, varying rubbing velocities and fluctuating loading.

By providing closed continuous lubricating oil grooves at pressure feed zone and open ended grooves for splash feed zone on the cylindrical interface of the contacting parts to achieve high film strength without affecting the load bearing capacity for reducing friction.

The types of oil grooves are helical, spiral, circular, curved, straight and the nature of grooves are cross-cut, parallel, continuous or a combination thereof depending on the nature of relative motions and loading. The location, selection, formation and advantages of grooves in interfaces of cylindrical contacting surfaces of moving parts are best explained in description with drawings.

The direct advantage of introduction of this lubrication pattern in present invention reduces the friction and improves the relative movement of the contacting parts.

Hence improvement in mechanical efficiency and increased performance besides assists each component to do its intended activity properly by improving relative motion without disturbances. As a result of physical activities of engine component perfection, physical delay is reduced.

The chemical activities are also perfected as a result of controlled combustion on perfectly sealed interfaces which are achieved by improvement in proper actuation and seating of inlet and exhaust valves on its seats and improvement in piston motion and its seating with the cylinder bore. Hence perfecting chemical activities reduce chemical delay.

On account of reduction of physical and chemical delays, the ability of the engine to burn the formulated fuel without knock/combustion noise, increase mechanical octane/cetane numbers of internal combustion engine by incorporating this lubrication pattern.

The original formulated fuel thus becomes the premium fuel facilitating engine design with higher/lower compression ratios for further better performance with the limitation being imposed by the nature of application, operating temperature and stricter emission standards or to introduce earlier ignition/injection timing for providing sufficient time to burn the fuel to extract more work at the output shaft and leaving the products of combustion reducing pollutants.

Hence this is a low cost new engine design technology according to this invention. It is economical even to implement this new engine technology for in-use new engine at any time and in-use old engine during major overhaul period giving real performance benefits to the user.

Chemicals added to the fuel as additives increases the fuel cost besides contribute to misapprehension of fuel and initiate toxic exhaust emissions. Incorporating this new engine design technology facilitate the use or low octane/cetane rating fuel without certain additives reduces the requirements or additives. It therefore become further object of the invention to disclose a low cost fuel design technology based on the improvement made in internal combustion engine with respect to earlier said objective.

The operating temperature range of lubricant is narrowed down by incorporating this new engine design technology facilitate the use of low-grade lubricant oil without certain additives making it cheaper as well as indirectly contribute to reduce toxic exhaust emissions by preventing misapprehension of lubricant oil. It therefore become the still further object of the invention to disclose a low cost lubrication oil design technology based on the improvement made in internal combustion engine with respect to earlier said objective.

In short, with the improvement made in the internal combustion engine with respect to the above objectives, the strategy for the control of pollution will thus become apparent as excess air coefficient, enhanced earlier static and self regulated ignition/injection without knock and noise in the combustion system reduces CO, UBHC, $NO_x$ and particulate in the exhaust emission which is yet another object of the invention.

BRIEF DESCRIPTION OF THE DRAWINGS

For a better understanding of the nature of this invention and to show how the same may be carried into effect, reference will now be made to the accompanying drawings in which:

FIG. 1A shows a prospective view of upper shell of crankshaft main insert bearings having oil grooves in accordance with the invention.

FIG. 1B shows a prospective view of lower shell of crankshaft main insert bearings having oil grooves in accordance with the invention.

FIG. 2 shows a prospective view of upper/lower shell of connecting rod big end insert bearings having oil grooves in accordance with the, invention.

FIG. 3A shows a side view of a connecting rod small end with bush having oil grooves in accordance with the invention.

FIG. 3B shows a sectional view taken along line D—D of FIG. 3A.

FIG. 4 shows a sectional view taken along the line E—E of a piston.

FIG. 5 shows a side view of a piston having oil grooves in accordance with the invention and sectional cylinder bore.

DESCRIPTION OF THE PREFERRED EMBODIMENTS

Figure 6:
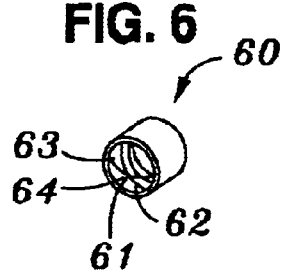
FIG. 6 shows a prospective view of cam bush having oil grooves in accordance with the invention.

Please note that most of the elements of internal combustion engine are common with those of the prior art internal combustion engine so that further explanation for the elements common to both the invention and the prior art is thus not deemed necessary.

Before going through particular embodiments of the invention, it is better to classify the lubricating oil grooves formed either on the inner or outer surface of the contacting parts cylindrical bearing surface of internal combustion engines for reducing friction and other advantages as described below after each embodiments.

The first oil groove formed is two cross cut similar grooves one being right hand and the other left hand so that it intersects and form cross cuts. When the cross cut grooves are continuous and within the bearing surface it is a closed groove for maintaining the oil pressure. When the cross cut grooves extend outside so that it is opened to the sides of the bearing surface, it is an open ended groove to receive or supply oil through the open ends.

The second oil groove is a circular groove formed at the center of the cylinder bearing surface so that it communicates with oil hole if provided and passing through the cross cuts of the first oil groove.

The third oil groove is an axial groove-formed on the cylinder-sliding surface.

The description of preferred embodiments is demonstrated with two cross cut helical grooves as first oil groove.

in an embodiment of FIGS. 1A and 1B a first lubricating oil groove 20 formed on the inner surfaces 21 of the upper shell 22 and lower shell 23 of the main insert bearing shells so that when inserted on crank shaft main journal, closed continuous first oil groove formed with the cross cuts 24 at the centre of each shell occupying the upper and lower location. The first groove should not pass through the locating lugs 25 to avoid discontinuity.

A second oil groove 26 formed on the inner surface of both shells, if not provided by the prior art, passing through oil hole 27. Second oil groove 26 receives oil from supply oil hole 27 and distributes to the first oil groove 20. The first and second closed oil groove 20 and 26 together receive and distribute pressurized oil over the entire bearing cylindrical interface.

Sufficient lubrication over the entire bearing length with high film strength, proper cooling to the main insert bearing—crankshaft main journal interface is achieved by providing these additional oil grooves, which regulate the hydrodynamic lubrication regime formed not to generate viscous friction as a result of cross cut location and converging or diverging nature of first oil groove, the cross cut points 24 where first and second oil groove meet, have more bearing area length wise to resist fatigue load caused by gas pressure acting on the crown of the engine piston 40 and inertia forces. Hence frictional contact area is reduced without affecting load bearing capacity of the bearing, improves mechanical efficiency, in addition the rotational speed of the crank shaft which rotates on main insert bearings, is increased, increasing operational performance, reducing torsional stress of crankshaft assists in forming protective films between shaft and bearing reduce foaming which prevents corrosion on bearings. Proper oiliness and wiping is achieved. Low heat generation because of adequate lubrication and cooling prevents frictional abrasion and prolong life of main insert bearings and crankshaft (not shown).

Shown in FIG. 2, is an embodiment of big end insert bearing shell 31 of two similar shells, first and second oil grooves 32 and 33 formed on the inner surface of the big end insert bearing so that all the oil grooves have a closed path to maintain oil pressure when both shells are inserted over the crankshaft big end journal of the crankshaft as described in the main insert bearing earlier. The second groove 33 receives oil from the big end journal oil hole and distributes to the first oil groove 32.

The intersecting points 34 of first off groove 32 are located at the upper and lower location of the bearing shells when inserted in position so as to reduce fluctuating impact load due to reciprocating action of piston stroke extremities contact stress at these points 34 which are otherwise will be more. The other advantages described for main insert bearing are also applicable in this big end reciprocating bearing. It prevents the fatigue stress and this prolongs life and ensures proper operation.

As shown in FIGS. 3A and 3B, connecting rod small end 35 with bush 36 of this invention have closed continuous first oil groove 37 to maintain pressure so that the intersecting points 38 placed on the top and bottom positions for facilitating oil communication from the supply oil hole 39 at the top. One second oil groove 40 is formed so as to communicate with two intersection points 38.

In the case of connecting rod small end without bush, similar first and second oil grooves are formed on the inner surface of the small end as described in the FIGS. 3A and 3B.

The supplied oil amount to the interface connecting rod small end—piston pin is increased by the two oil grooves 37 and 40 whereas the contact and shear stress are reduced by locating the intersection points 38 at the stroke extremities area where fluctuating impact loads are high. As this interface is subjected to more fatigue load than crankshaft big end journal—big end insert bearing, more similar advantages are achieved as described earlier. In addition, the oscillating motion at this interface is improved.

With reference to FIG. 4, there is shown an embodiment of piston 40 pin-bosses 41 in which each piston pin boss—piston pin (not shown) interface has a first open end oil groove 42 with cross cuts 43 are formed so as to locate at the upper and lower locations where fluctuating impact loads are high and a second oil groove 45 passing through the cross cut 43 of first oil groove 42.

Sufficient enhanced lubrication to the interface piston pin boss—piston pin is achieved through the open ends 44 of the groove 42. The frictional contact area between the interface is reduced whereas the relative oscillating motion is increased and this improves the mechanical efficiency. The fluctuating load induced higher contact stress at the upper and lower location of the piston pin bosses 41 are reduced by the nature of enhanced lubrication present by virtue of locating first oil groove cross cut at this high contact stress zone, which prevents abrasions and impact wear and prolongs life at all operating speeds and fluctuating loads.

With reference to FIG. 5 the embodiment shown is parallel second and third intersecting oil grooves 50 and 51 formed on the outer contacting surface of the piston skirt 52 each third oil groove 51 originates from the oil escape hole 53, to be formed if not provided by prior art, on the piston skirt 52 and broached downwards to the piston skirt bottom 54 whereas the second oil grooves 50 are broached on the outer surface of the piston skirt 52 to form continuous grooves more or less equally spaced with respect to third oil grooves 51 and intersecting at right angles at points 55.

Adequate the splash oil reaching the under side of piston comes out through the oil escape hole 53 provide at the top of the piston skirt from there it is received & distributed through second and third oil grooves 50 and 51 formed at the piston skirt thereby sufficient lubrication with adequate film thickness of required strength is formed between the piston 40 and cylinder bore 56 for proper sliding motion proper orientation of piston rings and proper sealing between piston-rings (not shown) and cylinder bore 56 which prevents mass loss and oil entering into the combustion chamber by proper wiping of piston rings. This avoids oxidization of oil, maintain proper viscosity, and prevent corrosiveness caused by corrosive gases formed by burning sulphur present in fuel with oil. Due to proper wiping, cylinder bore, piston, piston skirt, ring, ring grooves are clean and avoid sludge formation. As sufficient oiliness is present avoids rusting of parts and formation of hard carbon.

FIG. 6 shows the cam bush 60 of the invention having in the inner contacting surface therein formed closed continuous first and second oil grooves 62 and 63 to maintain oil pressure as described earlier.

Smooth lubrication to the interface cam bush 60 and camshaft journal 71 is achieved. Second oil groove 63 receives oil from the oil supply hole 72 of the cam shaft and acts as reservoir for distributing oil to first oil groove 62, the cross cut points 64 being placed at the upper and lower locations where stress due to intermittent load is more. The rotation speed of camshaft 70, which rotates in cam bush 60, is increased and helps to impart prompt motion to tappets 80. The abrasive wear is also reduced and thus improves the life of the contacting parts. The other advantages described for crankshaft main insert bearing are also achieved.

Figure 7:
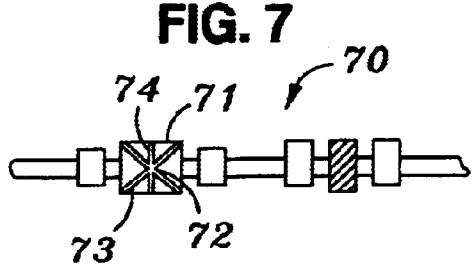
FIG. 7 shows a side view of camshaft having oil grooves in accordance with the invention.

Shown in FIG. 7, is another embodiment with first and second oil grooves 73 and 74 which can alternately be formed on the outer surface 71 of camshaft 70 without cam bush 60 with similar advantages as described above.

Figure 8:
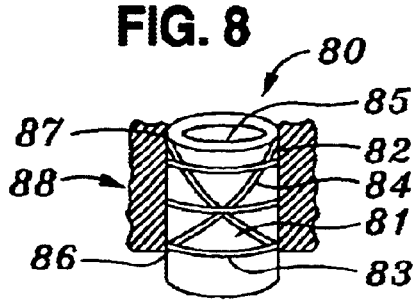
FIG. 8 shows a prospective view of tappet having oil grooves in accordance with the invention and sectional tappet bore.

With reference to FIG. 8, shown an embodiment on the outer surface 81 of Tappet 80 are three parallel more or less equally spaced second oil grooves 82 bottom groove being passing through oil drain hole 83 and one open end first oil groove 84 is formed as shown. Sufficient drained lubricating oil collected inside tappet 85 is supplied through the oil escape hole 83 to the lower second oil groove at the lower open ends 86 of first oil grooves 84 which receive oil whereas upper open ends 87 receive drain oil directly therefore, sufficient oil supply for the formation of high strength film between Tappet 80 and Tappet guide 88 frictional contact area reduced, improved sliding movement and proper positioning between the sliding members are achieved, which avoid extreme pressure build up thereby reducing abrasion and heat built up at the contacting parts besides avoids loss of mechanical efficiency. Welding at this sliding interface prevented by the physical presence of oil film.

Figure 9:
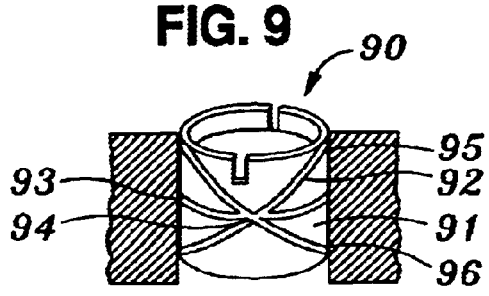
FIG. 9 shows a prospective view of cam follower having oil grooves in accordance with the invention and sectional cam follower bore.

FIG. 9 shows an embodiment on the outer surface 91 of cam follower 90 with open ends 95 and 96 of first oil groove 92 and one second oil groove 93 passing through the cross cut points 94. Upper open ends 95 directly receive drain oil from cylinder head (not shown) and distribute to the first and second oil grooves 92 and 93 over the entire sliding interface and oil is drained to the crankcase through the lower open end 96 facilitallty more oil circulation for proper cooling and enables high strength film formation, besides other benefits as described for tappet 80.

Figure 10:
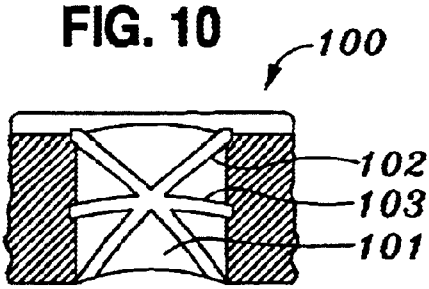
FIG. 10 shows a sectional view of cam follower bore having oil grooves in accordance with the invention.

Shown in FIG. 10, is an embodiment which is alternatively formed on the inner surface 101 of the cam follower bore 100 with first oil groove 102 and second oil groove 103 as shown and have similar benefit as described for tappet 80.

Figure 11:
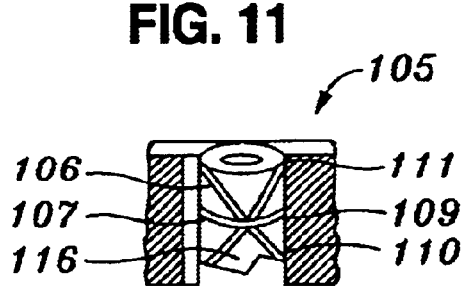
FIG. 11 shows a prospective view of fuel injection pump roller tappet having oil grooves in accordance with the invention and sectional fuel injection pump roller tappet bore.

FIG. 11 shows an embodiment on the outer surface 116 of fuel injection pump roller tappet 105 with open ends 110 and 111 of first oil groove 106 and one second oil groove 107 passing through the cross cut points 109. Upper open ends 111 directly receive and distribute to the first and second oil grooves 106 and 107 over the entire sliding interface and oil is drained to the pump gallery through the lower open end 110 facilitallty more oil circulation for proper cooling and enables high strength film formation, besides other benefits as described for tappet 80.

Figure 12:
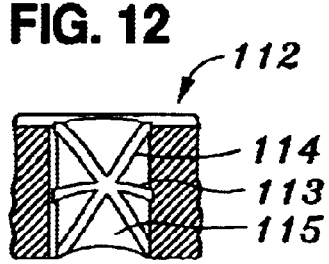
FIG. 12 shows a sectional view of fuel injection pump roller tappet bore having oil grooves in accordance with the invention.

Shown in FIG. 12, is an embodiment which is alternatively formed on the inner surface 115 of the fuel injection pump roller tappet bore 112 with first oil groove 114 and second off groove 113 as shown and have similar benefit as described for tappet 80.

Figure 13:
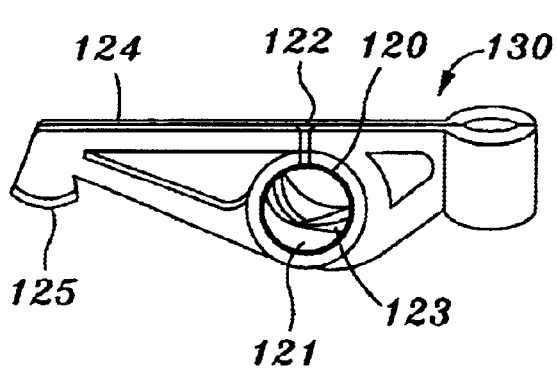
FIG. 13 shows a prospective view of rocker arm with bush having oil grooves in accordance with the invention.
Figure 14:
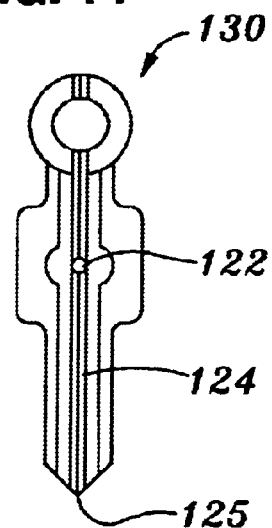
FIG. 14 shows a top view of a rocker arm having oil hole and furrow in accordance with the invention.

FIG. 13 shows the rocker shaft bush 120 of the invention in which the inner contacting surface 121 have all similar oil grooves as in cam bush described with reference to FIG. 6. In addition, an oil escape hole 122, to be formed if not provided by prior art in communication with second oil groove 123 for onward transmission of oil to the rocker arm deep "v" shaped furrows 124 formed on the upper surface of the rocker arm 130 passing through oil escape hole 122 and extending both ways of the rocker arm length as shown in the FIGS. 13 and 14. A sharp convex rocker arm to valve stem pad 125 is providing for reducing contact friction due to impact load.

Figure 15:
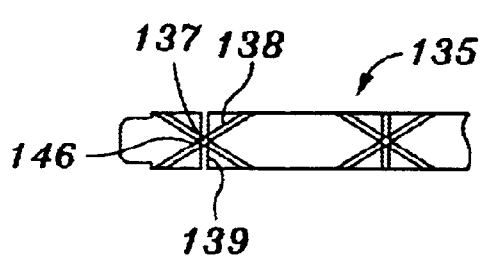
FIG. 15 shows a side view of rocker arm shaft having oil grooves in accordance with the invention.
Figure 16:
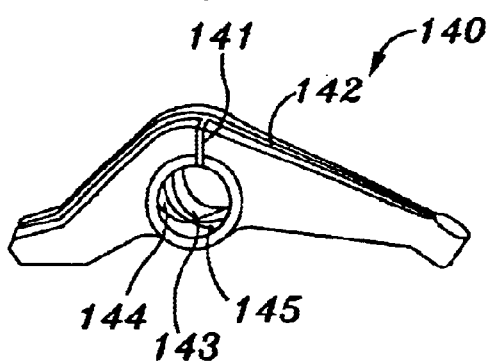
FIG. 16 shows a prospective view of a rocker arm having oil grooves, furrow, vertical and horizontal slots in accordance with the invention.

FIG. 15 shows a rocker arm shaft 135 of the invention which need to be used only in conjunction with the rocker arm 140 without bush shown in FIG. 16, on the outer contacting surface 136 of the rocker arm shaft 135 a first oil groove 138 and a second oil groove 139 are formed so as to communicate with oil supply hole 137. Horizontal and vertical slots 142 and 141 are formed on the rocker arm side and top as shown in the FIG. 16.

Alternatively in FIG. 16 of the invention, first and second oil grooves 143 and 144 are formed in the inner surface 145 of the rocker arm 140 as described earlier in FIG. 13.

By this arrangement as described from FIG. 13 to FIG. 16, it is possible to increase the oil supply to the oil escaping hole 122 which is in communication with oil supply hole 146 of rocker arm shaft through oil grooves provide proper cooling avoids heat build up at the pivot area thereby minimize the friction at the fulcrum. Further the fulcrum friction contact area is reduced and the cross cut points of first oil grooves are positioned at the upper and bottom locations of the contacting inner or outer surfaces to take care of fatigue—intermittent load caused by the side thrust on the contoured surface of the valve stem so as to have adequate lubrication for sufficient film formation, to resist fatigue stress and avoid fatigue wear and thereby prevent scoring and prolong life of these contacting parts. Heat build up at the both ends rocker arm to push rod end (not shown) and rocker arm to valve stem pad where the rocker shaft engages with push rod and valve stem are reduced because of increased oil flow to these areas through the rocker arm furrow.

This additional oil grooves provide regulated escape oil lubrication to all the contacting parts of camshaft group and improves relative movement between the contacting parts. Thereby better actuation of inlet and exhaust valves (not shown) are achieved and avoids all types of vibration at both valves.

Better opening and closing of both inlet and exhaust valves are achieved due to the improvement made in relative movement of all contacting parts of camshaft group as a result of increased oil flow, to avoid build up heat, reduced frictional contact area with better lubrication characteristics for maintaining sufficient lubrication and cooling at all operating conditions.

In addition, the contoured surface area of valve stem is sufficiently lubricated, as described above, assists in proper orienting, sufficiently cooling and guiding the valves and improves sliding relative movement, maintain correct valve timing at all operating conditions and good sealing at valve seats.

The increased escape oil quantity enhances the splash lubrication system in the crankcase (not shown) whereby the cylinder, piston skirt and piston pin bosses with the improvement made to receive lubricating oil through open-ended grooves receive and distribute the same for efficient lubrication of these contacting surfaces described before.

Providing additional grooves as described above at the interface either in the inner surface of the cylindrical bearing or bush or at the outer surface of the contacting parts of the internal combustion engine reduces the friction contact area, thereby reduce friction at the rotating, oscillating, reciprocating, sliding and intermittent reciprocating interfaces of moving parts and increase relative motions, hence mechanical efficiency and performance of the engine is increased besides overcoming other disadvantages described earlier.

Adequate lubrication with high film strength facilitated by the pressurized oil present in the closed continuous first and second grooves almost over the entire bearing, bush or shaft contact length.

Sufficient lubrication with adequate film strength over the entire bearing, bush or shaft contact length through splash oil received at the open ends of first and third oil grooves. The second groove provided at each of the cylindrical bearing, bush or shaft interface acts as a oil reservoir for receiving and supplying depending on the requirement at first oil grooves for distributing for the formation of hydrodynamic regime at the same time not to cause viscous friction as a result of cross-cut action of first oil grooves and the upper and lower cross-cut points where all these grooves meet have more bearing, bush or shaft area lengthwise to resist fatigue stress caused by the combustion system preventing heat generation and metal wear at the interfaces, assist to maintain oil film strength and prolong life of engine moving components, proper cooling, interior cleaning and wiping without foaming are also achieved.

The directs advantages derived from the principal objective are improvement in overall mechanical efficiency of engine in addition to improvement in relative motion between piston and crankshaft as well as between piston and valves. Hence there is an increase in performance of engine and the physical delay is reduced, on account of the improvement made, each engine components is doing its intended work in the stipulated time.

Since dissipation of available energy as friction due to improper physical is activities reduced on account introduction of sufficient lubrication at all contacting parts interfaces of internal combustion engines, maximum available energy could be converted into shaft work and fulfills the principal object of this invention.

With the improvement made on the contacting parts of internal combustion engine components based on the said principal objective, it is possible to reduce both mechanical and fluid friction, thereby the temperature difference between the system and the surrounding is reduced.

Once the physical activities of the engine are corrected, it has become necessary to correct chemical activities of fuels and forms the basis for an another objective of the invention.

Proper orientation of piston ring provides good sealing in cylinder bore and proper actuation of valves without jump, jerk, quirk provides good sealing at valve seating. Hence it becomes possible to achieve proper compression and combustion to increase indicated performance by combusting the air and fuel, in the combustion chamber diminution of pollution at the exhaust gas and reduces chemical delay.

In spark ignition engine, the chemical delay is controlled by the engine design whereas mechanical octane defined an engine design. Hence mechanical octane is increased with this improvement enabling the formulated spark ignition engine fuel to perform like premium spark ignition engine fuel enabling higher compression ratio design with the same formulated fuel for more power and fuel economy without pollution.

In compression ignition engine, the physical delay is controlled by the engine design whereas mechanical cetane depends on engine design. Hence mechanical cetane is increased with this improvement enabling the formulated compression ignition engine fuel to perform like premium compression ignition engine fuel enabling lower compression ratio design with the same formulated fuel for more power and fuel economy without pollution.

Now by introducing an earlier ignition/injection timing system, gives extra time to burn the fuel without knock and noise due to increase in mechanical octane/cetane numbers of engines and thereby increased fuel economy is achieved whereas the combustion end products leaves the system with reduced pollutants.

Figure 17:
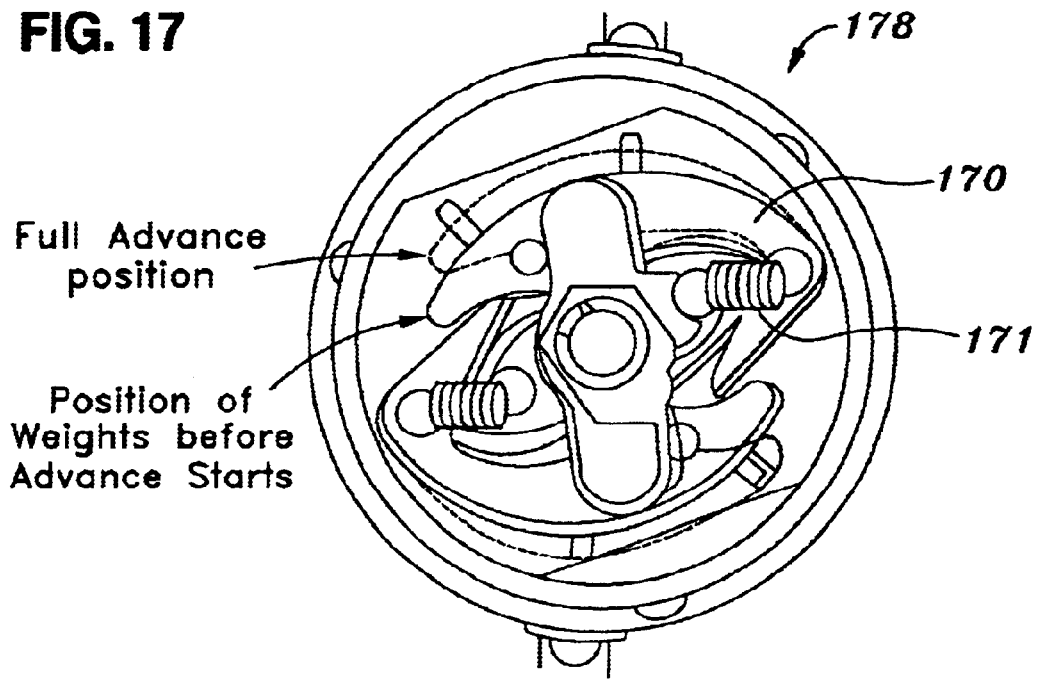
FIG. 17 shows a top view of a spark ignition distributor showing spring governed centrifugal flyweight of the invention.
Figure 18:
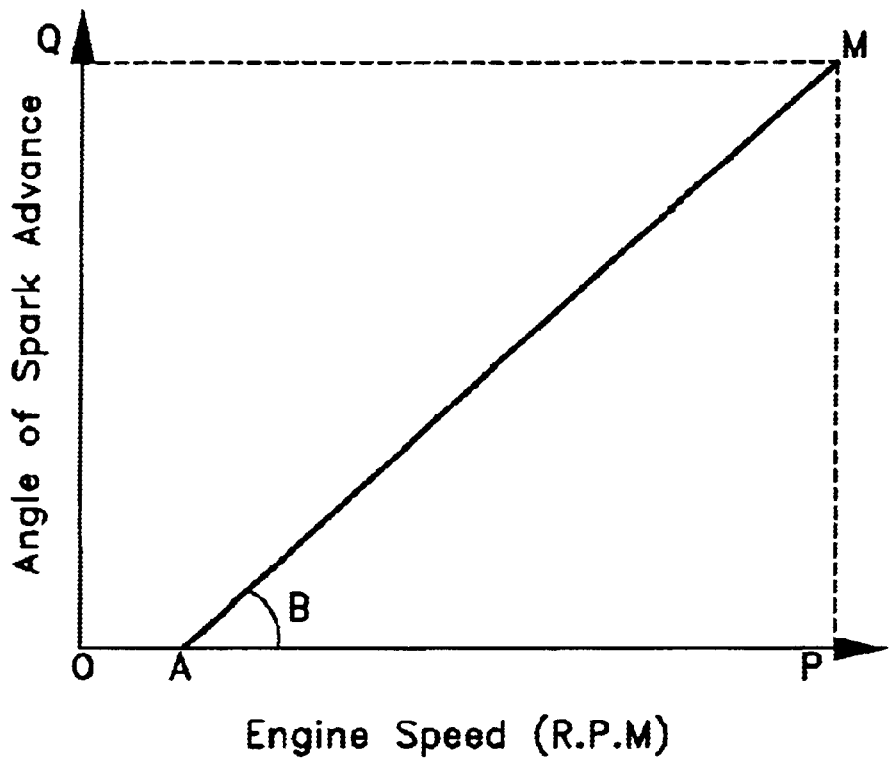
FIG. 18 shows performance graph illustrating the operation of the mechanism shown in FIG. 17.

Shown in FIG. 17, is an embodiments of spark ignition distributor centrifugal fly weights 170 which are lighter in weight and are in engagement with another embodiment springs 171 fabricated with less stiffness so that angle of spark ignition advance with respect to engine speed performance are in accordance in the nature of graph shown in FIG. 18.

Figure 19:
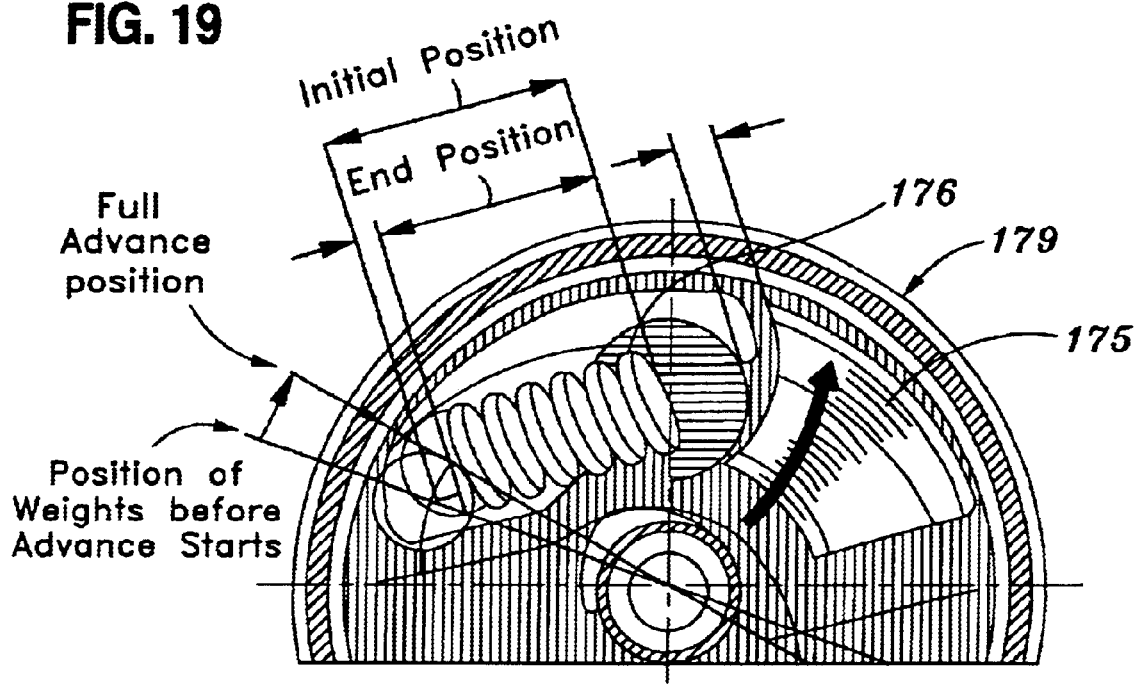
FIG. 19 shows a side view of a fuel injection timer shown spring governed centrifugal flyweight of the invention.
Figure 20:
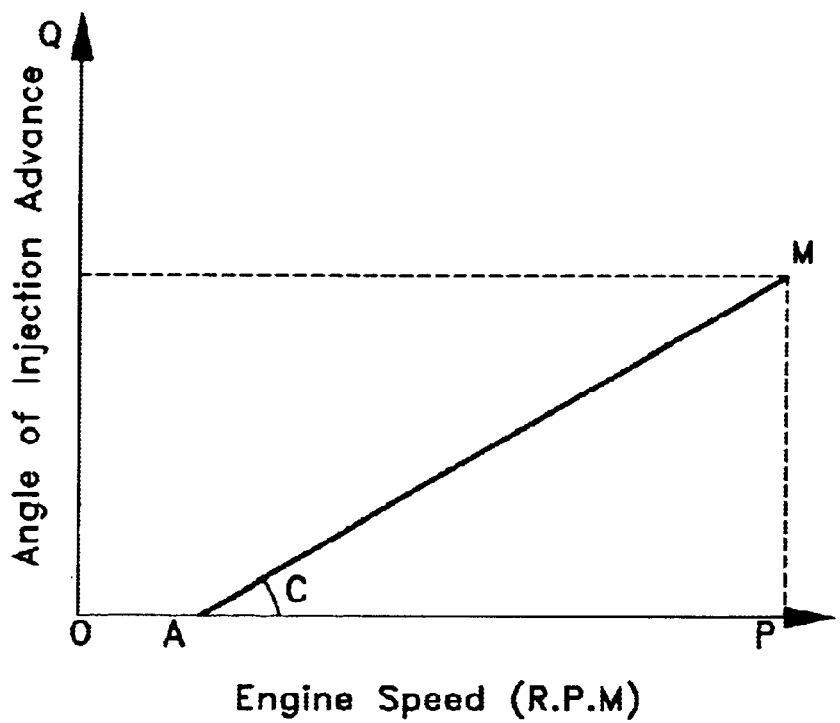
FIG. 20 shows performance graph illustrating the operation of the mechanism shown in FIG. 19.

Shown in FIG. 19, is an embodiments of fuel injection timer centrifugal fly weights 175 which are lighter in weight and are in engagement with another embodiment springs 176 fabricated with less stiffness so that angle of injection advance with respect to engine speed performance are in accordance in the nature of graph shown in FIG. 20.

Turning back to FIGS. 18 and 20, shown are performance graphs of angle of spark/injection advance with respect to engine speed of spark ignition distributor 178/fuel injection timer 179.

The spring governed centrifugal fly weights 170 and 175 begins to function from idle engine speed indicated by the point A and increase or decrease advance angle of spark ignition B/advance angle of injection C in proportion to increase in engine speed between idle engine speed to maximum engine speed.

These centrifugal fly weights 170 and 175 regulates ignition /injection advance over the entire speed range from idling to maximum engine speed for extracting maximum power from the chemical activities of fuel. In addition, it enables to control deceleration emissions. Hence an another object of invention is achieved.

More time is available for the preparation of reactive mixture during compression stroke and hence more combustion at constant volume than at constant pressure thereby reduces heat loss and increase thermal efficiency. With the implementation of the above two objectives, it becomes possible to adopt slightly lower equivalence ratio than stoichlometric throughout the entire operating range whereby provide a mechanism for increase fuel economy and assists control of emission and thus forms the basis for new engine modelling as it fulfils both thermodynamic and mechanical performance requirements of an internal combustion engine.

It is easy to manufacture the preferred embodiment components of the internal combustion engine, without much change in productionising process or available facility to manufacture, besides saving in cost due to reduction of material as a result of implementation of this invention.

Hence this is a low cost new engine design technology for engine modelling and fulfils the yet an another objective of the invention. It is economical even to implement this technology for in-use new engine at any time and in-use old engine during major overhaul period for better safety, performance, fuel economy and reduction emission giving real performance benefits to the user.

It is suitable for both spark ignition and compression ignition as well as 2-cycle and 4-cycle operation internal combustion engine. This low cost engine technology finds wide application in automotive including racing, locomotive, marine, industrial, agriculture and aeronautical fields to suite different duty cycle (light, medium or heavy) and various types of fuel.

Once proper engine modelling is achieved with respect to thermodynamic and mechanical performance as a result of utilizing available energy in fuel by preventing dissipation of energy as friction which causes heat loss and emission loss, there is a need to use appropriate fuel and lubricant oil for achieving better fuel economy and reducing operational cost.

By preventing friction in the operation of an internal combustion engine by modelling engine with present invention makes possible to adopt earlier enhanced static ignition/injection advance without knock or combustion noise and possible utilization of lower octane/cetane. Thus by implementing the new engine design technology of the invention provides a method for formulating a new low cost fuel design technology which is a further object of the invention.

Additional possible benefits realized from the present invention include enhanced engine cleanness, enhanced lubrication, increased power benefits and reduced fuel consumption, increased power benefits and reduced wear. Thus requirements of fuel additives are reduced, lowering the cost of fuel, besides avoids misapprehension of fuel and control emissions.

The improvement made with respect to the above objective in the lubrication pattern, for sufficient lubrication between the interfaces of rotating, reciprocating, sliding, oscillating and intermittent reciprocating contacting parts of achieved and loading at these interfaces are reduced where as relative velocity is increased thereby prevents rolling contact wear, sliding wear, abrasive wear and impact wear thereby reduce stress and consequent heat generation at these interfaces where lubrication oil is circulated. As a result the operating temperature of the lubrication oil reflects only the resultant temperature by virtue of heating or cooling nature of circulation path which will optimize by itself on account of cycle by cycle operations of transmitted heat and not on generated heat at the interfaces. Hence the operating temperature of lubrication oil is far below the on-set temperature not much affecting the viscosity of oil.

Since the operating temperature range of lubrication oil is narrowed down to a lower limit, an higher viscosity lubrication oil of lower cost may be used and thus provides a method for the design of low cost lubrication oil technology and fulfills the said object of the invention.

Sufficient lubrication with adequate film thickness of required strength is found between piston and cylinder bore for proper sliding motion, orientation of piston rings and proper sealing between the piston-ring and cylinder bore. Hence prevents mass loss and oil entering into the combustion chamber by proper wiping of piston rings. This avoids oxidization of oil, maintain proper viscosity, and prevent corrosiveness caused by corrosive gases formed by burning sulphur present in fuel with oil and avoid depositing in combustion chamber. Due to proper wiping, cylinder bore, piston, piston skirt, ring, ring grooves are clean and avoid sludge formation. As sufficient oiliness is present avoids rusting of parts and formation of hard carbon and hence reduce requirement of lubricating oil additives.

Relatively lower equivalence ratio reduce CO emissions, due to earlier static ignition/injection, UBHC reduced in addition to further reduction of left out CO; and due to governed earlier ignition/injection from idle to maximum engine speed the pressure and temperature of the combustion system are lower without any knock or combustion noise thereby reduce NO, emissions. On account of reduction of these three emissions particulate emission is also reduced. During deceleration, the gradual retard angle of ignition/injection reduces the said CO, UBHC, $NO_x$ and particulate emissions without much deviation and fulfils the another principle object of the invention.

Reduction of mechanical and fluid friction by the improvement made in tribological aspect of internal combustion engine enable to reduce emission loss by introducing earlier ignition/injection timings to extract more work from thermodynamic aspect as a result of reduced potential temperature difference in combustion system which in turn reduce the temperature difference between the system and the surroundings and hence reduce heat loss to surroundings facilitating the combustion process of fuel more efficient resembling more or less a reversible process. Therefore by reducing the dissipation of available fuel energy utilized in overcoming mechanical and fluid friction, which in turn cause heat and emission losses facilitating extraction of more work at the output shaft of the present invention of internal combustion engine. In addition use of proper natural fuel and lubricant oil with minimum additive, if necessary in the low cost new technology internal combustion engine enable further control of emission and saving of fuel.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A low cost new internal combustion engine with increased mechanical efficiency, comprising a main insert bearing supporting a crankshaft having rotary motion for converting the sliding motion of attached pistons due to the pressure generated by the combustion system; said crankshaft being connected to said pistons through a connecting rod with optional cross head and piston pin; said connecting rod comprising a big and a small end; said connecting rod big end attached to said crankshaft by connecting rod big end insert bearings for rotary motion; said connecting rod small end attached to said piston pin through a connecting rod small end bushing for transmitting oscillating motion; said piston pin connected directly to the piston pin bosses of said piston; said piston having a piston skirt for guiding inside the cylinder bore for reciprocating motions; a camshaft driven by said crankshaft for actuating inlet and exhaust valves and injectors controlling said combustion system; said camshaft supported by a cam bushing or cam journal housing in the cylinder head for transmitting and converting the rotary motion of said cam shaft into sliding motion of a tappet inside a tappet bore or to a cam follower inside a cam follower bore; a fuel injection pump roller tappet inside a fuel injection roller tappet bore; a rocker arm mounted on a rocker shaft through a rocker arm bushing for transmitting intermittent reciprocating motion; said arm engaged on one side with a push rod pushed up by said tappet, and engaged on the other end with a valve stem for actuating said valves or injectors; a charge of lubricant oil, used to lubricate the interfaces of contacting parts for lubrication; a charge of fuel; said combustion system drawing a homogenized or aerosol mixture of fuel and air; a spark ignition device for ignition of said fuel-air mixture; optionally, said ignition device receiving metered-out charges of fuel injected by an injection device controlled by a spring governed centrifugal advance mechanism for the self regulation of ignition; said injection with respect to the crank angle for effective utilization of the combustion pressure acting on the crown of said piston without knock or combustion noise; combustion end products leaving said combustion system as exhaust emission, characterized in that the lubricating system consists of:

(a) at least one first cross cut oil grove formed at the interface cylindrical bearing surface of the contacting parts on the inner surface of the main insert bearing, connecting said big rod end insert bearing, said cross head bearing, said connecting rod small end bushing, said connecting rod small end, said piston-pin bosses, said cam bushing, said cam follower bore, said fuel injection pump roller tappet bore, said rocker arm bushing, said rocker arm end on the outer surface of said piston skirt, said cam shaft main journal, said rocker arm shaft, said tappet, said cam follower, said fuel injection pump roller tappet adopted as reservoir for receiving and distributing oil from the supply source; the crosscut point being positioned at the maximum stress zones for maintaining adequate oil supply for cooling and reducing contact in the interface;

(b) at least one second circular oil groove formed at the interface cylindrical bearing surface of the contacting parts on the outer surface of said piston skirt, said tappet, said cam follower, said fuel injection pump roller tappet, said cam shaft main journal, said rocker arm shaft and on the inner surface of the main insert bearing, the connecting rod big end insert bearing, the cross heard bearing, the connecting rod small end bushing, the connecting rod small end, the piston-pin bosses, the piston skirt, the cam bushing, the cam follower bore, the fuel injection pump roller tappet bore, the rocker arm bushing, and the rocker arm for receiving and distributing oil to said first cross cut oil groove for maintaining adequate oil supply;

(c) at least one third axial oil grove intersecting with either the first or the second oil groove or hole formed on the piston skirt outer surface for maintaining adequate lubricating oil supply for proper sliding motion, cooling and avoiding contact due to thrust force with said cylinder bore;

(d) at least one deep "v" furrow formed on the upper surface of the rocker arm lengthwise for onward transmission of escape oil to both ends;

(e) at least one slot formed on the side or upper surface of the rocker arm for onward transmission of escape oil to both ends; and (f) said spark ignition or fuel injection device having spring governed centrifugal advance fly weights for self regulation in proportion with engine speed from idle to maximum engine speed.

2. An internal combustion engine according to claim 1, wherein said first cross cut oil groove is helical, spiral, curve, lead screw or a combination thereof with adequate width and depth depending on the contact area and nature of loading to deliver an adequate lubricating oil supply to maintain proper lubrication.

3. An internal combustion engine according to claim 1, wherein said first cross cut oil groove encompasses a closed path to maintain adequate oil pressure of the available supply source to deliver an adequate lubricating oil supply to maintain proper lubrication, and for receiving and supplying oil from said source.

4. An internal combustion engine according to claim 1, wherein said contacting parts have one or more second oil grooves formed in communication with a supply oil hole therein and therethrough passing the cross cuts of first oil grooves for rotating, reciprocating and oscillating contacting parts through both upper and lower reversal points of sliding contacting parts for maintaining adequate oil receiving and distributing at the interface and at the extremities.

5. An internal combustion engine according to claim 1, wherein said piston skirt has one or more third parallel axial oil grooves intersecting with said first or second oil grooves or a combination thereof formed to maintain adequate uniform distribution of oil and proper sliding of metal contacting surfaces.

6. An internal combustion engine according to claim 1, further comprising a spring-controlled centrifugal fly weight of a spark ignition device, said device having two lighter fly weights and two lower stiffness springs, said springs being one end attached to the fly weight pivot pin and the other end connected to the cam of suitable contour in combination thereof so that the centrifugal force of said spring governed fly weight governs the ignition advance during acceleration and deceleration with a smooth pre-determined rate against the direction of engine rotation from idle to maximum engine speed.

7. An internal combustion engine according to claim 1, wherein said spring governed centrifugal advance fly weight of said fuel injection device has two lighter fly weights and two lower stiffness springs housed inside said centrifugal advance fly weight with one end of each of said springs connected to the fly weight pivot pin, and the other end being in engagement with the fly weight long curvature through a cam of suitable contour in combination thereof so that centrifugal force of the spring governed fly weight governs the injection advance during acceleration and deceleration with a smooth predetermined rate against the direction of engine rotation from idle to maximum engine speed.

8. An internal combustion engine according to claim 1, wherein said combustion engine operates under 2-stroke or 4-stroke cycles.

9. An internal combustion engine according to claim 1, wherein said internal combustion engine operates on either spark ignition or compression ignition systems.

10. An internal combustion engine according to claim 1, wherein said internal combustion engine is suitable for use in automotive applications including racing, locomotive, marine, industrial, agricultural and aeronautical fields.

11. An internal combustion engine according to claim 1, further comprising a design of said engine which is contrived to reduce fuel octane rating.

12. An internal combustion engine according to claim 1, further comprising a design of said engine which is contrived to reduce additive levels in the fuel.

13. An internal combustion engine according to claim 1, further comprising a design of said engine which is contrived to operate with low grade lubricating oil.

14. An internal combustion engine according to claim 1, further comprising a design of said engine which is contrived to reduce additive levels in the lubricating oil.

15. An internal combustion engine according to claim 1, wherein said exhaust emissions are controlled as a result of said combustion system operating on excess aid coefficient as well as earlier ignition and injection characteristics at all operating conditions, whereby reducing emissions levels of Carbon Monoxide (CO), Unburnt Hydrocarbon (UBHC), Nitrous Oxide (NO*), Particulate Matter (PM); and thereby assists to maintain air quality standards.

16. An internal combustion engine according to claim 1, wherein said first cross cut oil groove encompasses an open path with grooves ends open on either sides of contacting cylindrical bearing surface parts, for the purpose of maintaining the oil pressure of the available supply source and for receiving and supplying oil from said source.

* * * * *